March 18, 1969 W. MEHNER 3,433,599
LIQUID-LIQUID EXTRACTOR
Filed May 16, 1966

Inventor:
WOLF MEHNER
BY Burgess, Dinklage & Sprung
ATTORNEYS.

Inventor:
WOLF MEHNER
BY
Burgess, Dinklage & Sprung
ATTORNEYS.

- - - HEAVY & LIGHT MIXTURE
= = = HEAVY PHASE
- - - LIGHT PHASE

INVENTOR
WOLF MEHNER
BY
Burgess, Dinklage & Sprung
ATTORNEYS.

United States Patent Office 3,433,599
Patented Mar. 18, 1969

3,433,599
LIQUID-LIQUID EXTRACTOR
Wolf Mehner, Konigstein, Taunus, Germany, assignor to Metallgesellschaft Aktiengesellschaft, Frankfurt am Main, Germany
Filed May 16, 1966, Ser. No. 550,471
Claims priority, application Germany, Oct. 12, 1965, M 66,916
U.S. Cl. 23—270.5                                 7 Claims
Int. Cl. B01d *11/04*

In order to separate liquids from materials, it is already known to use so-called liquid-liquid extraction, the substance dissolved in one solvent being extracted by another solvent of higher dissolving power and which is of only limited miscibility with the first-mentioned solvent. Among the numerous methods available, those operating by the counter-current principle have proven best since they effect a gentle and intense separation. The exchange between the two phases takes place, for instance, by intermittent or continuous advance of one or the other solvent. For liquid-liquid extraction, both horizontal and vertical extractors are used, which include several extraction stages. The two phases are brought into intimate contact in the individual stages, for instance by means of agitators or mixers, and are then separated in separating stages. Since the mechanical separating effect of the two phases depends on their quantity ratio and the quantity ratio which is best for the mechanical separation frequently does not coincide with the optimum for the over-all extration, one of the two liquids—generally the light phase—is frequently reemployed in a closed circuit in each stage in order to be able to adjust the phase ratio in the individual stages independently of the phase ratio in the over-all process. A method is also known in which each stage consists of a mixing chamber, mixing pump and a completley filled separating chamber and in which the one liquid pases in a straight passage through all stages while the other liquid during its passage through the extraction stages is in part recycled in closed circuits in each stage, as a result of which quantities of liquid greater than those introduced into the extractor are drawn off from the separating surface between the two liquids of the completely filled mixing chamber connected both at its top and at its bottom with the separating chamber and mixed and conveyed into the following entirely full separating chamber.

For the carrying out of the method, there has been described, for instance, a multi-stage extractor, the extraction stages of which are equipped with mixing pumps and separate mixing and separating chambers, the lower part of the mixing chamber being connected with the lower part of the separating chamber of the next stage while the upper part of the mixing chamber is connected with the upper part of the separating chamber of the next stage. For example, in an extractor with the stages disposed one above the other and the lowermost stage is stage one (stages numbered in the direction of flow of the lighter phase), each stage includes a separating chamber, mixing chamber and pump; a mixing chamber is disposed laterally of each separating chamber, and is in communication with the separating chamber as described, and is the mixing chamber for the preceding stage. Thus, the separating chamber for say stage 3, has disposed laterally thereof, the mixing chamber for stage 2 and the separating chamber for stage 2 is disposed below stage 3 and receives, for separation material from its mixing chamber, after the same has been mixed by the mixing pump for stage 2. In this way the result is obtained that with negligibly small resistances in the connecting paths, the separating level in the mixing chamber determines, in accordance with the law of communicating vessels, the separating level in the separating chamber of the next stage. In the example given, the level in the mixing chamber 2 determines the level in the separating chamber 3.

The known designs have the disadvantage that with large rates of flow, the streams of liquid, particularly those of a heavy phase, encounter such high resistance in the mixing chambers that the separating surfaces in the corresponding separating chambers are substantially higher than is to be expected in accordance with the law of communicating vessels.

Another disadvantage of the previously known extractors is that the height of the separating surfaces in the mixing chamber is determined by the height of the inlet connection for the circulating pumps and is thus fixed within narrow limits.

The bottoms of the extractors were heretofore preferably made flat. Aside from the fact that roughnesses in the bottoms, caused for instance by welding stresses, cannot be entirely avoided, this development has the disadvantage that the bottoms have to be supported at numerous points, particularly in the case of large apparatus. This supporting by supporting means is, however, disadvantageous, since the supports have an unfavorable influence on the flow of the liquid.

It is the object of the present invention to eliminate these drawbacks.

The present invention provides a multi-stage liquid-liquid extractor with closed circuits (recycle) of the light phase in each stage, in which extractor the height of the separating surface in the mixing chambers is transmitted to the level of the separating surface in the separating chamber of the next stage as seen in the direction of flow of the light phase in accordance with the law of communicating vessels, the outer walls of the risers for the light phase forming the outer walls of the extractor, and the inner walls being so developed that the distance apart of the separating skirts increases approximately linearly from the outside to the inside.

In accordance with a further development of the invention, the passage of the light phase from one stage into the next takes place through openings which are arranged as mirror images of each other in successive stages.

In accordance with the invention, the height of the separating layers in the mixing chamber can be varied by adjustable weirs or slots.

In accordance with a further development of the apparatus of the invention, the partitions between the individual stages have the shape of a flat cone with its apex facing upward.

The development of the risers for the light phase in accordance with the invention in such a manner that the outer walls thereof form the outer walls of the extractor and the inner walls are so developed that the distance from the separating skirt increases linearly from the outside, has the advantage that the flow both of the light phase and of the heavy phase is exposed to only very slight resistance which is approximately the same for both phases since both phases of the mixing chamber flow with approximately the same speed.

By the further measure of the invention of varying the height of the separating surface in the mixing chambers by means of adjustable weirs or slots and thus no longer being dependent on the height of the inlet connections for the circulating pumps, a larger free space is provided for construction than has previously been possible. More particularly, the operating conditions do not then determine the level at which the inlet to the mixing pump should be located, since the weir can be adjusted to fix the effective inlet level.

The flat conical shape of the partitions with upward directed apices in accordance with the invention is not only advantageous from the standpoint of fluid dynamics, but it has surprisingly been found that the separation is substantially better than with the flat bottoms previously used.

The apparatus in accordance with the invention is characterized by a simple construction and is particularly well suited for a high rate of passage with stagewise circulation of the light phase. With a method which operates with solvent as heavy phase, there is furthermore obtained a considerably saving of solvent and thus an economic advantage.

The apparatus of the invention and its manner of operation will be explained in detail by way of example on the basis of FIGURES 1 to 6 of the drawing in which.

Figure 1:
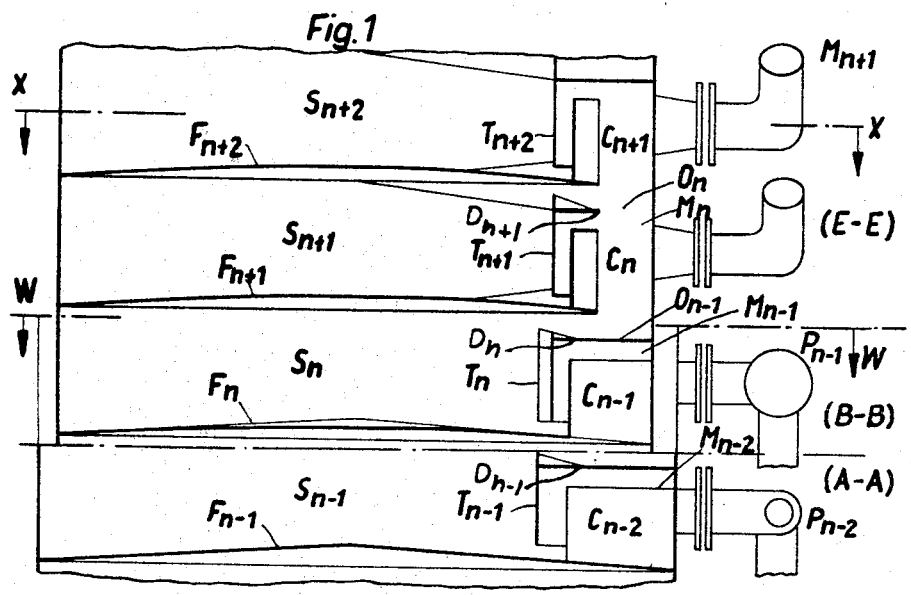
FIGURE 1 shows three different vertical cross-sections.
Figure 2:
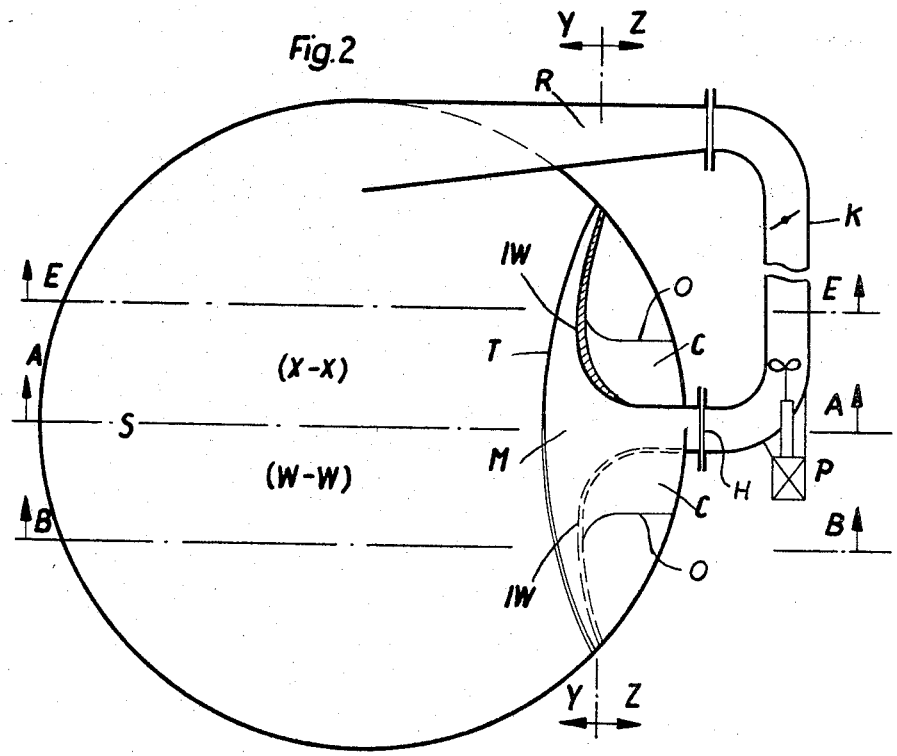
FIGURE 2 shows two different plan views.
Figure 3:
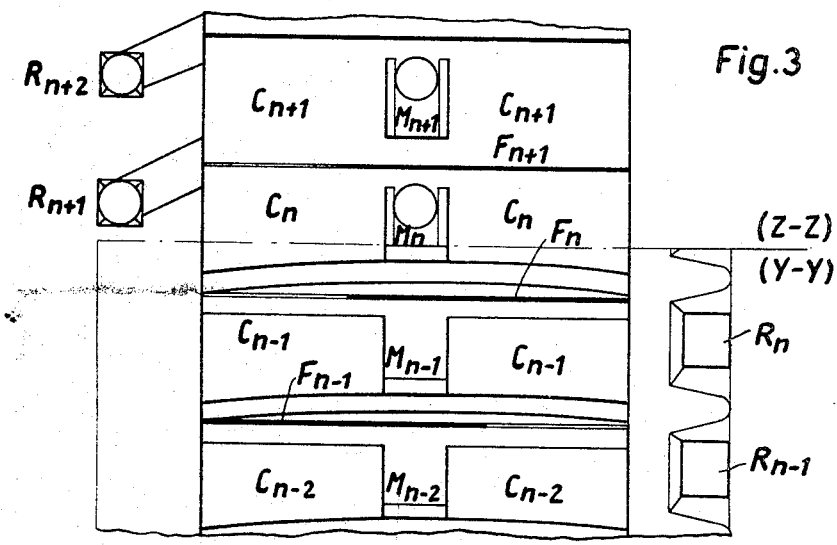
FIGURE 3 shows two different vertical sections through central stages of an extractor.

The position of the cross-sections of FIGURES 1 and 3 is shown in FIGURE 2, while the position of the plan views of FIGURE 2 is shown in FIGURE 1, all with corresponding Latin capital letters.

The extractor consists essentially of a plurality of mixing chambers M and an equal number of mixing pumps P and separating chambers S. All stages are arranged one above the other and separated from each other by slightly conical bottoms F. All separating chambers S are all located one above the other, as are also all of the mixing chambers M. The mixing chamber M (for instance $M_n$) is alongside of and at the same height as the separating chamber ($S_{n+1}$) of the next stage (as seen in the direction of flow of the light phase). Mixing chambers M and separating chambers S are separated fro each other by skirts T. The skirts T have specific spacings from the respective conical bottoms F adjacent thereto and permit the passage of the light and heavy phases; in the cover plates D there are openings O for the passage of the light phase from one stage into the next, these openings being arranged in mirror images of each other in adjacent stages, i.e., in one case to the left and in the next case to the right of the inlet connections H of the mixing pumps P.

Figure 7:
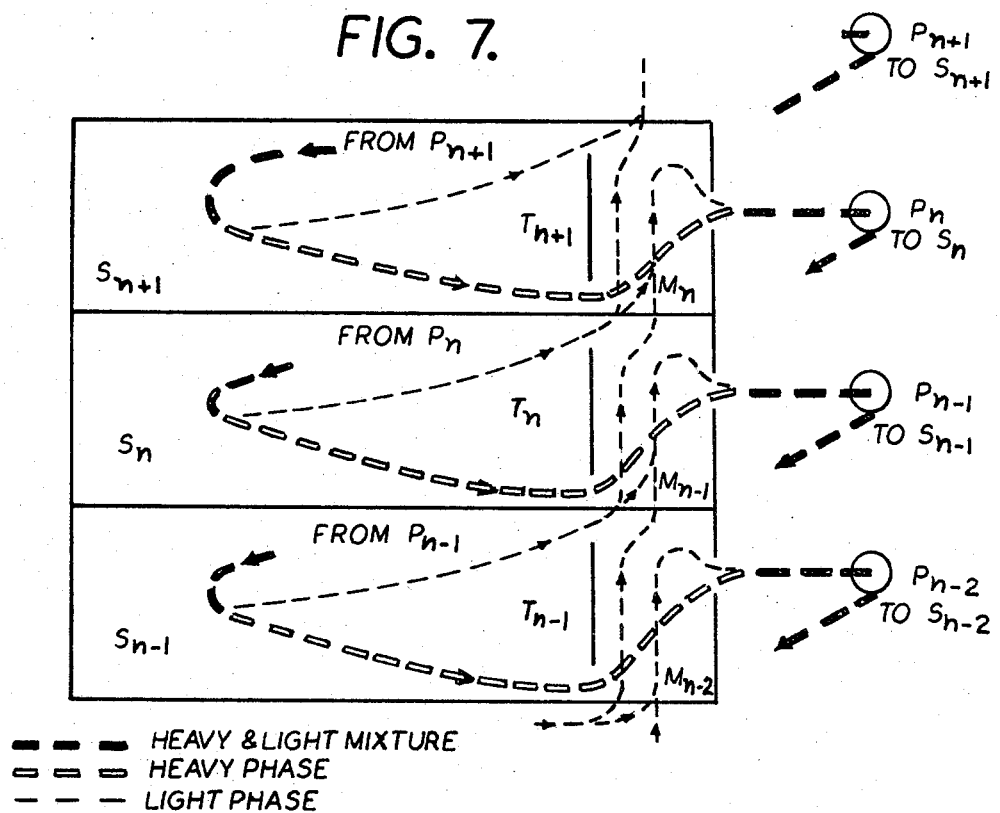
FIGURE 7 is a schematic showing indicating the flow paths of various streams.

Referring to FIGURE 7, the course of the flow in the central stages of a multi-stage extractor is as follows:

The light phase travels upward and the heavy phase downward. The heavy phase passes, for instance, from the separating chamber $S_{n+1}$ below the skirt $T_{n+1}$ into the mixing chamber $M_n$, is drawn in together with light phase, by the mixing pump $P_n$, mixed and forced through the retardation cone $R_n$ (FIG. 2) into the separating chamber $S_n$, separates here from the light phase and leaves the stage $n$ under the skirt $T_n$ passing into the mixing chamber $M_{n-1}$. The heavy phase passes through the stage $n$ in direct passage (no recycle).

The light phase from the separating chamber $S_{n-1}$ passes over the top of skirt $T_{n-1}$ and then passes upward in risers $C_{n-1}$ having inlet openings in the bottom of separating plate $F_n$ and extending upwardly to termination short of the cover plate $D_n$, so that the light phase is conducted by the risers to the mixing chamber $M_{n-1}$. (The risers are not shown in FIG. 7, but can be seen in FIG. 8, wherein the risers for the light phase from $S_{n-1}$, are indicated by the reference characters $C_{n-1}$.) Some of the light phase issuing from risers and entering the mixing chamber is drawn together with heavy phase into mixing pump $P_{n-1}$, which directs the mixture into mixing chamber $S_{n-1}$, so that this part of the light phase is a recycle stream. The balance of the light phase entering $M_{n-1}$, passes through an opening in cover plate $D_n$ (not shown in FIG. 7, but shown in FIG. 8 and there indicated by the reference character $O_{n-1}$). This balance, with light phase from separating chamber $S_n$, passes into mixing chamber $M_n$, in the manner, described above, that light phase entered mixing chamber $M_{n-1}$, and thus a portion of the light phase from separating chamber $S_{n-1}$ is taken up by pump $P_n$, along with some light phase from $S_n$, and is thereby advanced to separating chamber $S_n$. The process continues in this manner from stage to stage as is indicated in FIGURE 7. The openings O, such as $O_{n-1}$ shown in FIGURE 8, and staggered with respect to the risers, so that successive openings O are disposed at opposite ends of the cover plates D. In this way, flow of light phase beyond the mixing chamber of the next stage (received in the direction of flow of lighter phase) is prevented.

The light phase is in part recycled, this recycle, however, being always limited to a single stage and in no case leading to any injurious back mixing.

Figure 8:
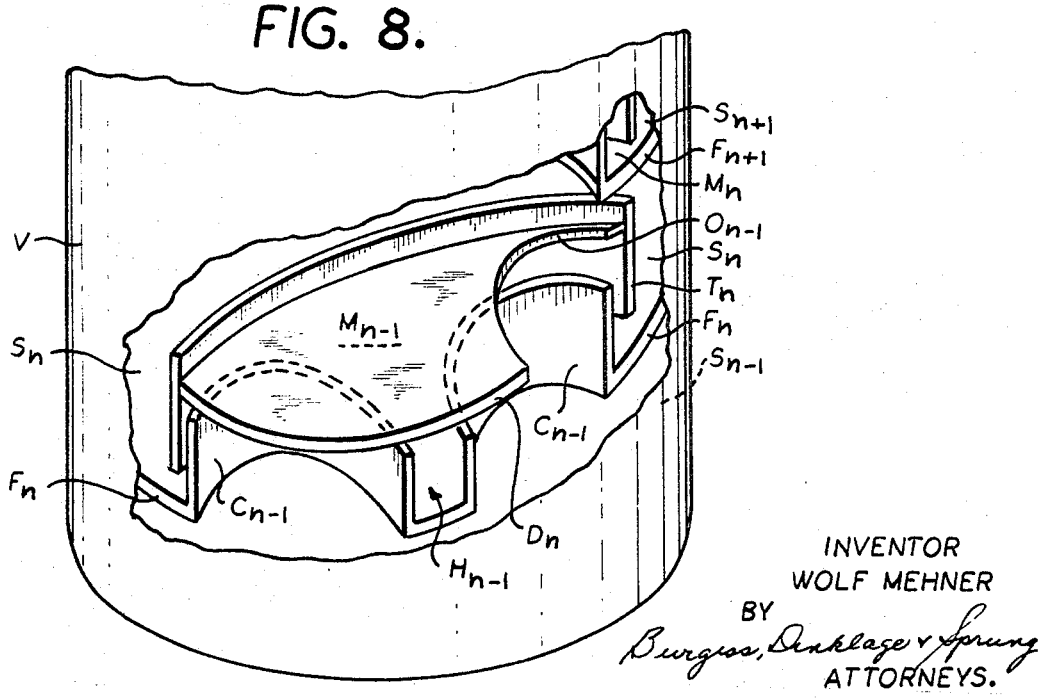
FIGURE 8 is an isometric view of an extractor vessel with a part of the shell broken away to show internal construction.
Figure 9:
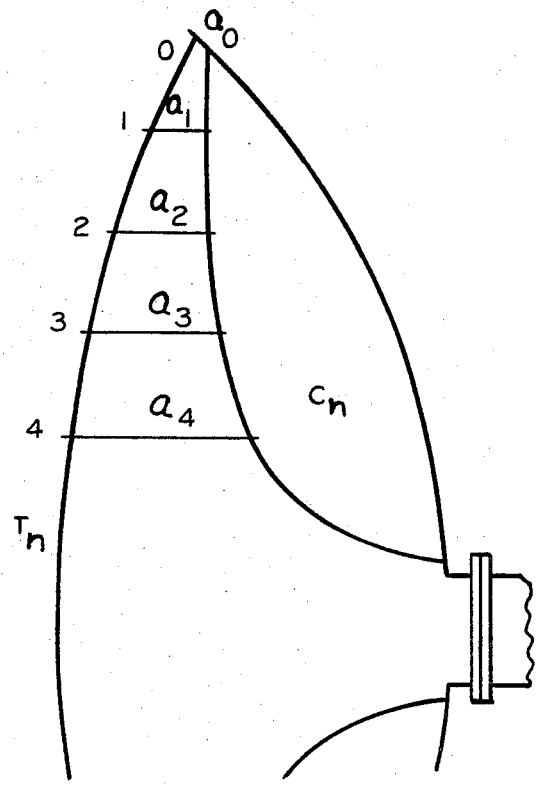
FIGURE 9 shows the relative position of the separating aprons $T_n$ to the chimneys of the light phase $C_n$.
Figure 10:
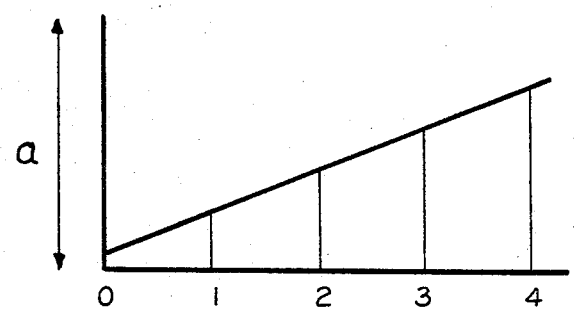
FIGURE 10 is a graph of the breadth of the flow channel between the separation apron $T_n$ and the chimney for the light phase as a function of the distance from the extractor outside wall.

The construction of the separating chambers and mixing chambers is illustrated in a perspective view in FIGURE 8, wherein the construction of separating chamber $S_n$ and the mixing chamber $M_{n-1}$, which is located alongside separating chamber $S_n$, is shown, as well as a portion of the mixing chamber $M_n$ and the separating chamber $S_{n+1}$. Separating chamber $S_n$ is disposed between bottom plates $F_n$ and $F_{n+1}$. The arcuate skirt $T_n$ is secured, as by welding, at its ends to the wall of the vessel V, and the bottom thereof is spaced from the bottom plate $F_n$, while the top thereof is spaced from the overlying bottom plate $F_{n+1}$. A cover plate $D_n$ extends from the skirt to the wall of the vessel, and is provided with a cut-out forming opening $O_{n-1}$. Arcuate risers $C_{n-1}$ extend upwardly from the bottom plate $F_n$ and terminate short of the cover plate $D_n$. Thus, a mixing chamber is defined substantially by the skirt $D_n$, the cover plate $D_n$ and the risers $C_{n-1}$. The mixing chamber $M_{n-1}$ communicates with its pump $P_{n-1}$ at the position indicated by the arrow $H_{n-1}$. In the successive stages the openings O in the cover plate D are disposed on alternate sides of the inlet opening from the vessel to the pump P. The mixing chamber is laid out so that the flowing mediums, light and heavy phase, find the lowest possible flow resistance. Therefore, it is appropriate to have the path of the heavy phase in the mixing chamber, i.e., the interval between the separation apron $T_n$ and the chimney for the lighter phase $C_n$, become approximately linearly broader, coming from the edge. This is shown in FIGURES 9 and 10.

The pumping power of the pumps P is so adjusted by suitable means, for instance by flaps K (FIG. 2), that the batch in the separating chambers S has the desired composition of light phase and of heavy phase. This composition is so adjusted in operation that the phase separation is optimum. The pump must pump more than the sum of the quantity of heavy and light phases entering the stage. The amount of light phase pumped as stage recycle is the difference between the pumping power of the pump and the sum of the quantities of heavy phase and light phase entering the stage in question.

By the selection of suitable velocities of flow (preferably 0.1 to 0.2 meter/second) in the riser shafts C and in the free passage openings between the upper ends of the riser shafts C and the covers of the skirts T, the result is obtained that there prevails in all cases flows which are directed from the two riser shafts C to the inlet connections of the mixing pumps P which prevent light phase which comes from the next lower stage moving past the inlet connection of a mixing pump to the next stage without having participated in the exchange in the actual stage.

It resides in the very nature of an extraction that the densities of the two phases change during the course of the extraction. The separating level in the separating chamber $S_n$ of one stage is established on the basis of the separating level in the mixing chamber $M_{n-1}$ of the previous stage as seen in the direction of flow of the light phase, in accordance with the law of communicating vessels. In this connection the same heavy phase is present in both chambers while the light phase in the mixing chamber $M_{n-1}$ has a different density than the light phase in the separating chamber $S_n$. Since the path via the riser pipes previously used was relatively long and the densities of the liquid contained in the riser pipes were different, the heights of the separating levels in the separating chambers changed accordingly. With the new arrangement, the light phase of the mixing chambers, which passes through the opening O in the cover plates D, mixes with the light phase from the separating chambers, which passes over the upper edge of the skirts T, directly above the skirts T so that the effective columns with different density of the light phase are considerably shorter and, therefore, the change in the separating level in the separating chambers is insignificant.

Figure 4:
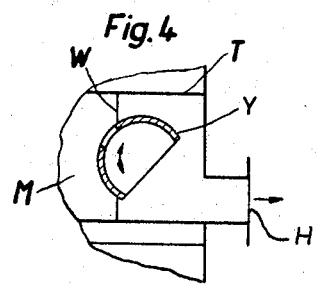
FIGURES 4, 5, 6 and 6a show schematically the means for changing the height of the separating surfaces in the mixing chambers.
Figure 5:
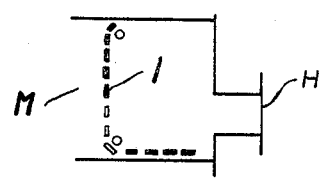
Figure 6:
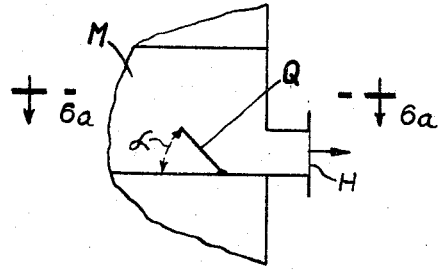
Figure 6A:
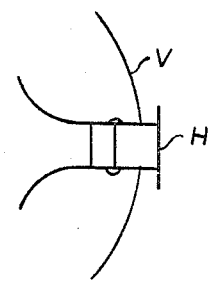

The change in the height of the separating surfaces in the mixing chambers is effected by disposing weirs in the inlet passageways to the pumps P. The weirs are of adjustable height, and, accordingly, the height of the separating surface in the separating chambers can be controlled by selection of the height for the weir. Referring to FIG. 4, wall W is disposed in the mixing chamber N, and is provided with a rotary slide valve Y. By selecting the position of the slide valve, the separating height can be adjusted. In the embodiment of FIG. 5, the adjustable weir is provided by the louver device J. In the embodiment of FIG. 6, the weir is provided by a hinged plate Q. As can be seen in FIG. 6a, the plate Q is disposed in a section of the inlet opening H to the pump associated with the mixing chamber, which is of uniform diameter. The plate can be secured in any selected position by friction, and access to the plate for changing the position thereof can be through the inlet passageway H. Since the weirs are provided, the inlet openings H for the pumps can be arranged at any desired elevation between the bottoms F and the covers D, since the separating level in the separating chambers is then not dependent on the level of the inlet opening to the pump, but rather on the position of the weir.

Thus, the invention provides a multi-stage liquid-liquid extractor comprising a vertically disposed vessel having a plurality of spaced, transverse plates, and an axially extending divider disposed between adjacent plates. The dividers are disposed so that a plurality of overlying separator chambers and a plurality of overlying mixing chambers are provided, and a mixing chamber is disposed laterally of each of the separating chambers. The dividers can be spaced from the plates disposed adjacent to and therebeneath, so that the separating chamber is in flow communication with the mixing chamber disposed laterally thereof, so that heavier phase can pass from the separating chamber to the laterally disposed mixing chamber. Also, means are provided which communicate each mixing chamber with the next lower separating chamber, for example, the pumps P and the piping associated therewith. Further, lighter phase transfer means communicate each separating chamber with the first higher and the second higher mixing chambers for delivering a portion of lighter phase from a separator chamber to the first higher mixing chamber for recycle of said portion to said separating chamber, and delivering another portion thereof to the second higher mixing chamber for advancing said other portion to the next higher separating chamber. According to the invention, the lighter phase transfer means comprises a cover plate for each of the mixing chambers extending divider thereof to the wall of the vessel, and two risers extending upwardly from each of the transverse plates to within the next overlying mixing chamber and terminating short of the cover plate of the last-mentioned mixing chamber. The risers of the respective transverse plates are vertically aligned, forming a first set and a second set of vertically spaced risers. Wall portions of the vessel, in part, define the risers.

Desirably, the risers of each transverse plate are disposed one on each side of the outlet from the mixing chamber to the means for transferring the mixture to the next lower separating chamber. Further, each of said cover plates can include an opening, such opening being over one of the risers disposed below and adjacent thereto. These openings are staggered so that the openings and adjacent cover plates are disposed over first a riser of one of the said riser sets and then a riser of another. The risers can comprise arcuate plates laid up with their ends abutting spaced areas of the vessel wall, whereby the arcuate plates and wall portions of the vessel define the risers. The riser plates of each transverse plate are spaced from the adjacent divider (which can be arcuate) between mixing and separating chambers, and the distance between the divider and riser plate increases approximately linearly as the riser plate approaches the outlet means for the mixing chamber in which the riser is disposed.

In a preferred embodiment, the transverse plates are dished, with the convex surfaces thereof facing upward.

While the invention has been described with respect to particular embodiments thereof, these embodiments are merely representative and do not serve to set forth the limits of the invention.

What is claimed is:
1. In a multi-stage liquid-liquid extractor comprising:
   (a) a vertically disposed vessel having a plurality of vertically spaced, transverse plates dividing said column into a plurality of stages, a vertically extending divider disposed between adjacent plates, said dividers forming a plurality of overlying separator chambers and a plurality of overlying mixing chambers with a mixing chamber disposed laterally of each separating chamber,
   (b) said dividers being spaced from the lower plates of each stage to provide means for communicating each separating chamber with the mixing chamber disposed laterally thereof for passage of heavier phase from the separating chamber to the laterally disposed mixing chamber,
   (c) outlet conduit means communicating each mixing chamber with the next lower separating chamber, means for mixing the liquid passing through said outlet conduit means,
   (d) lighter phase transfer means communicating each separating chamber with the first higher and the second higher mixing chambers for delivering a portion of lighter phase from a separator chamber to the first higher mixing chamber for recycle of said portion to said separating chamber and delivering another portion thereof to the second higher mixing chamber for advancing said other portion to the next higher separating chamber,
   (e) a light liquid inlet and a heavy liquid outlet in the bottom portion of said vessel, and a light liquid outlet and a heavy liquid inlet in the top portion of said vessel, the improvement in said lighter phase transfer means which comprises:
   (f) a cover plate for each of said mixing chambers extending horizontally from the divider thereof to the wall of the vessel, two risers extending vertically upward from each of said transverse plates to within the next overlying mixing chamber and terminating short of the cover plate of said next overlying mixing chamber, the risers of the respective transverse plates being vertically aligned forming a first set and a second set of vertically spaced risers, said risers defining in conjunction with the wall portions of the vessel the lighter phase transfer means communicating each separating chamber with the next higher mixing chamber, means defining a passageway for transfer of a portion of the light phase passing upwardly through a riser to provide the lighter phase transfer means communicating each separating chamber with the second higher mixing chamber.

2. An extractor according to claim 1, wherein the risers of each transverse plate are disposed one on each side of said outlet conduit means for the mixing chamber in which the risers are disposed.

3. An extractor according to claim 1, wherein said means defining a passageway is an opening in each of said cover plates over one of the risers disposed below and adjacent thereto, said openings being staggered so that the openings in adjacent cover plates are disposed over first a riser of one of said riser sets and then a riser of the other of said riser sets.

4. An extractor according to claim 3, wherein said risers are defined by vertically extending arcuate plates laid up with their ends abutting spaced areas of the vessel wall whereby the plates and wall portions of the vessel define the risers, the riser plates of each transverse plate being spaced from the adjacent divider, the distance between the divider and riser plate increasing approximately linearly as the riser plate approaches the outlet means for the mixing chamber in which the riser is disposed.

5. An extractor according to claim 1, wherein an adjustable weir is provided in the mixing chamber for controlling the level of the heavier phase in the mixing chamber, the said transverse plates being dished with surfaces thereof facing upward.

6. An extractor according to claim 1, wherein an adjustable weir is provided in the mixing chamber adjacent the outlet conduit means for said mixing chamber for controlling the level of the heavier phase in the mixing chamber.

7. An extraction according to claim 1, wherein said transverse plates are dished with the convex surfaces thereof facing upward.

References Cited

UNITED STATES PATENTS

| | | | |
|---|---|---|---|
| 2,201,550 | 5/1940 | Van Dyck | 23—270.5 X |
| 2,290,980 | 7/1942 | MacLean | 23—270.5 X |
| 2,594,675 | 4/1952 | Norell | 23—270.5 |
| 2,851,396 | 9/1958 | Myers | 23—270.5 X |
| 3,206,288 | 9/1965 | Hazen | 23—310 |
| 3,325,255 | 6/1967 | Greybal | 23—270.5 |
| 3,374,988 | 3/1968 | Eckert | 23—270.5 X |

FOREIGN PATENTS

| | | |
|---|---|---|
| 827,550 | 2/1960 | Great Britain. |
| 962,888 | 7/1964 | Great Britain. |
| 1,028,143 | 2/1953 | France. |

NORMAN YUDKOFF, *Primary Examiner.*

S. J. EMERY, *Assistant Examiner.*

U.S. Cl. X.R.

23—310; 196—14.52